(12) United States Patent
Humlicek et al.

(10) Patent No.: US 6,681,307 B1
(45) Date of Patent: Jan. 20, 2004

(54) METHOD AND SYSTEM FOR EXPANDING VOLUME CAPACITY

(75) Inventors: Donald R. Humlicek, Wichita, KS (US); Christina A. Stout, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 104 days.

(21) Appl. No.: 09/722,892

(22) Filed: Nov. 27, 2000

(51) Int. Cl.$^7$ .............................................. G06F 12/02
(52) U.S. Cl. ....................................... 711/171; 707/205
(58) Field of Search ................................ 707/205, 206, 707/101; 711/170, 171, 201, 172

(56) References Cited

U.S. PATENT DOCUMENTS

| | | | |
|---|---|---|---|
| 5,502,836 A | * | 3/1996 | Hale et al. .................. 711/170 |
| 5,675,769 A | * | 10/1997 | Ruff et al. ................... 711/173 |
| 5,956,745 A | * | 9/1999 | Bradford et al. ............ 711/137 |
| 6,070,172 A | * | 5/2000 | Lowe ........................... 707/205 |
| 6,088,778 A | * | 7/2000 | Ruff et al. ................... 711/173 |
| 6,115,799 A | * | 9/2000 | Ogawa ......................... 711/171 |

OTHER PUBLICATIONS

Google Groups, S. Widlake discussion thread, http://groups.google.com/groups?q=partition+enlarge+shift&hl=en&lr=&selm=s.widlake.1990.000D1C18%40rl.—ac.uk&rnum=1.*

* cited by examiner

Primary Examiner—Gary Portka
(74) Attorney, Agent, or Firm—Suiter West PC LLO

(57) ABSTRACT

The present invention is directed to a method and system for expanding volume capacity. A method of expanding volume capacity on a storage device may include receiving a request to expand capacity of a target volume by a requested amount. A first hierarchy is queried for unused capacity, wherein if unused capacity is at least one of greater than or equal to the requested amount, the unused capacity is positioned within the target volume. If unused capacity is less than the requested amount, at least one successive hierarchy is queried to locate unused capacity, which is at least one of greater than or equal to the requested amount, the successive hierarchy located at a logic block address further from a target volume logic block address than a first hierarchy logic block address. The unused capacity is then positioned to be included with the target volume.

41 Claims, 4 Drawing Sheets

METHOD AND SYSTEM FOR EXPANDING VOLUME CAPACITY

FIELD OF THE INVENTION

The present invention generally relates to the field of storage systems, and particularly to a method and system for recombining unused capacity for use in expanding volume capacity on a storage device.

BACKGROUND OF THE INVENTION

The storage of electronic data is one of the most important and pervasive aspects of modern life. Everything from bank account information to personal data and work product may be stored on storage devices, such as hard disks, disk arrays such as RAID arrays, and the like. Thus, the efficient access and use of data is of utmost importance.

An important aspect of data storage is the expansion of a volume of data on a storage device. A volume of data may be stored on a storage device to include data of a particular type, data from a particular source, user-defined segment of data, and the like. In certain instances, it is desirable to expand capacity of the volume to enable the volume to store additional data. However, previous methods utilized to increase volume size may involve rearranging the order of the volumes on the storage device. This may be undesirable for a number of reasons. For example, volumes may be located in a specific order on a storage device in order to take advantage of faster access times of the device. Therefore, volumes requiring more frequent access and/or greater access amounts may be positioned for faster access times and transfer over volumes with lower access needs. Additionally, previous methods may require increased volume movement and data movement, thereby requiring a greater period of time to perform the volume expansion as well as greater system resources.

Therefore, it would be desirable to provide an improved method and system for volume expansion on a storage device.

SUMMARY OF THE INVENTION

Accordingly, the present invention is directed to a method and system for expanding volume capacity. In a first aspect of the present invention, a method of expanding volume capacity on a storage device includes receiving a request to expand capacity of a target volume by a requested amount. A first hierarchy is queried for unused capacity, wherein if unused capacity is at least one of greater than or equal to the requested amount, the unused capacity is positioned within the target volume. If unused capacity is less than the requested amount, at least one successive hierarchy located at a logic block address further from a target volume logic block address than a first hierarchy logic block address is queried to locate unused capacity, which is at least one of greater than or equal to the requested amount. The unused capacity is then positioned to be included with the target volume.

In a second aspect of the present invention, a method of expanding volume capacity on a storage device includes receiving a request to expand capacity of a target volume having an initial capacity by a requested amount. The unused capacity of the storage device is determined and the target volume located. Successive hierarchies are queried for unused capacity, wherein a first hierarchy is queried before a second hierarchy. The first hierarchy is located at a logic block address closer to the target volume than the second hierarchy. Unused capacity is located, the unused capacity at least one greater than and equal to the requested amount. The unused capacity is positioned with the target volume to arrive at a target volume generally having the initial capacity and the requested amount.

In a third aspect of the present invention, a method of expanding volume capacity on a storage device includes receiving a request to expand capacity of a target volume having an initial capacity by a requested amount. Unused capacity of the storage device is determined. Successive hierarchies surrounding the target volume are queried for unused capacity, wherein a first hierarchy is queried before a second hierarchy, the first hierarchy located at a logic block address closer to the target volume than the second hierarchy, until unused capacity at least one greater than and equal to the requested amount is located. The unused capacity is then positioned to be included with the target volume.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 4, exemplary embodiments of the present invention are shown. The present invention provides a Dynamic Volume Expansion (DVE) feature to allow a user to increase the capacity of an existing volume. A volume group may include a group of drives, which allows a volume to be defined in equal blocks distributed across drives. Preferably, volumes are in contiguous blocks in storage to enable a mathematical calculation to be performed to determine where a specific block of memory will reside. However, utilizing previous expansion methods, volumes were expanded in noncontiguous segments, thereby making the calculation unavailable.

Unused storage may be interspersed between volumes. This may occur because of volume deletions, additions and the like. Unused storage may also exist on unused drives. As stated earlier, it is desirable to maintain a volume in a contiguous nature for the volume and its expanded capacity to preserve the performance,characteristics for the volume and enable a mathematical calculation to be performed to determine where a specific block of memory resides. In order to position unused capacity directly following the volume targeted for expansion, such as to maintain volume order, volumes within a storage device may be moved in both directions, some to higher logical block addresses (LBAs) and some to lower LBAs. The unused capacity may be in small "chunks" or segments scattered between volumes across the total storage device capacity, and may be added to achieve the desired capacity. Preferably, a search for the unused capacity starts at the volume targeted for expansion and moves outward from that volume until the total additional capacity amount is satisfied. In the following discussion, reference is made to movement of volumes and offsets with relation to each other, such as "up", "above", "below" and "down" for adding the discussion, which may be considered to be relative movement as defined by logic block addresses (LBA). For example, "up" may refer to a LBA lower in number than a previous LBA, "down" may refer to a LBA higher in number than a previous LBA, and the like.

Figure 1:
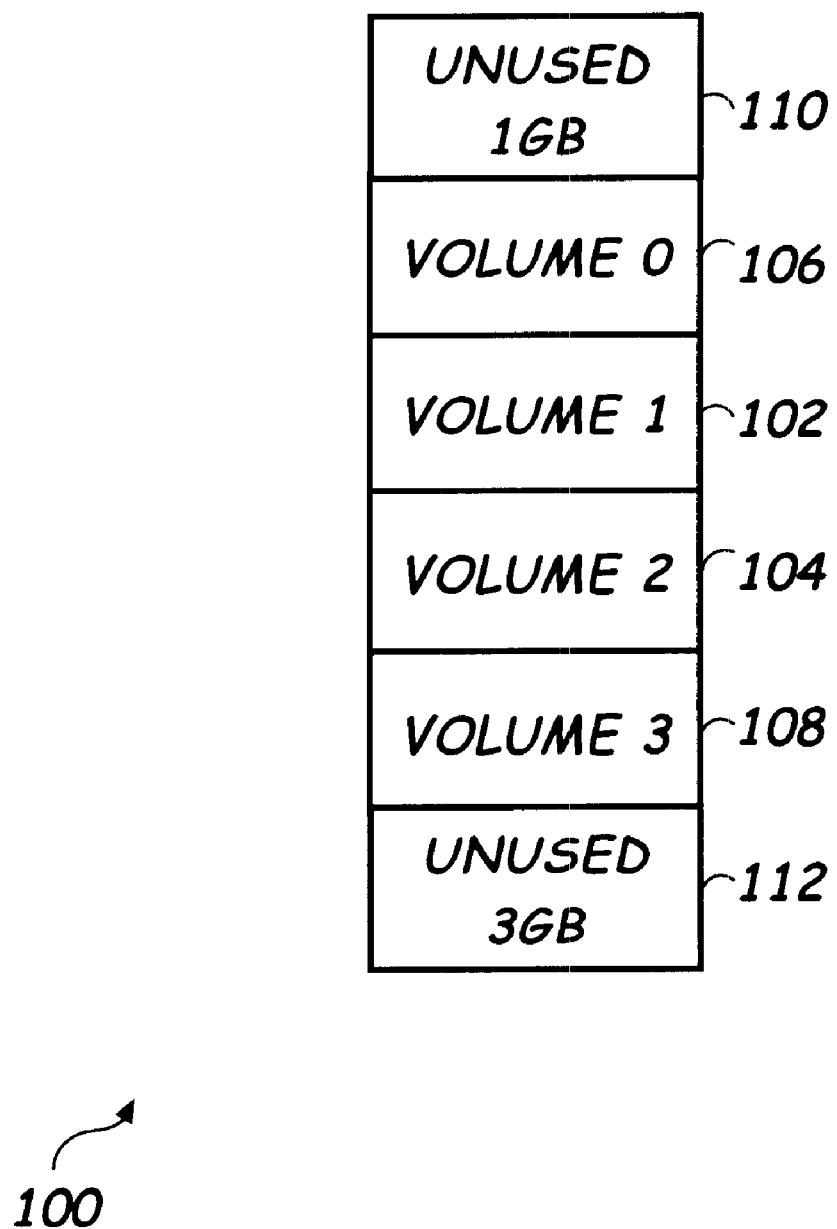
FIG. 1 is a block diagram depicting an exemplary embodiment of the present invention wherein unused capacity is positioned directly following a volume targeted for expansion, wherein a search for the unused capacity starts at the volume targeted for expansion and moves outward from the volume until the total additional capacity amount is satisfied.

Referring now to FIG. 1, an exemplary embodiment 100 of the present invention is shown wherein unused capacity is positioned directly following a volume targeted for expansion, wherein a search for the unused capacity starts at the volume targeted for expansion and moves outward from the volume until the total additional capacity amount is satisfied. For example, if 2.5 GB of extra space were desired for Volume One 102, the space directly below the DVE volume would first be queried 104. Since Volume Two 104 is there, the space directly above the DVE volume at Volume Zero 106 would be queried, and again, no space is available there.

Finally, after querying Volume Three 108, which again is unavailable space, unused capacity 110 is found in step 4 above Volume Zero 106, and thus may be used for the DVE. In order to position this unused capacity below Volume One 102, Volumes Zero 106 and One 102 must move up by the 1 GB that is available. This may be accomplished by decreasing the offsets of these volumes by 1 GB, which will cause them to move "up" (according to the diagram) once a reconfiguration operation runs to position the unused space. However, 1.5 GB is still required to increase the target volume. In this example, the next step finds additional unused capacity and will increase the offsets of Volumes 2 104 and 3 108 by 1.5 GB, which will cause the volumes to move 20 "down" (according to the diagram) once the reconfiguration operation runs.

In this way, successive hierarchies are queried, with the second hierarchy queried being positioned after the first hierarchy, such as a logical block address (LBA) located further away from the target volume LBA than the initially queried hierarchy. Thus, the unused capacity needed to expand a volume is found as close as possible to the target volume to provide minimal volume movement. Volume ordering is also conserved within the volume group in order to maintain the performance characteristics of a volume based on location within a drive.

Figure 2:
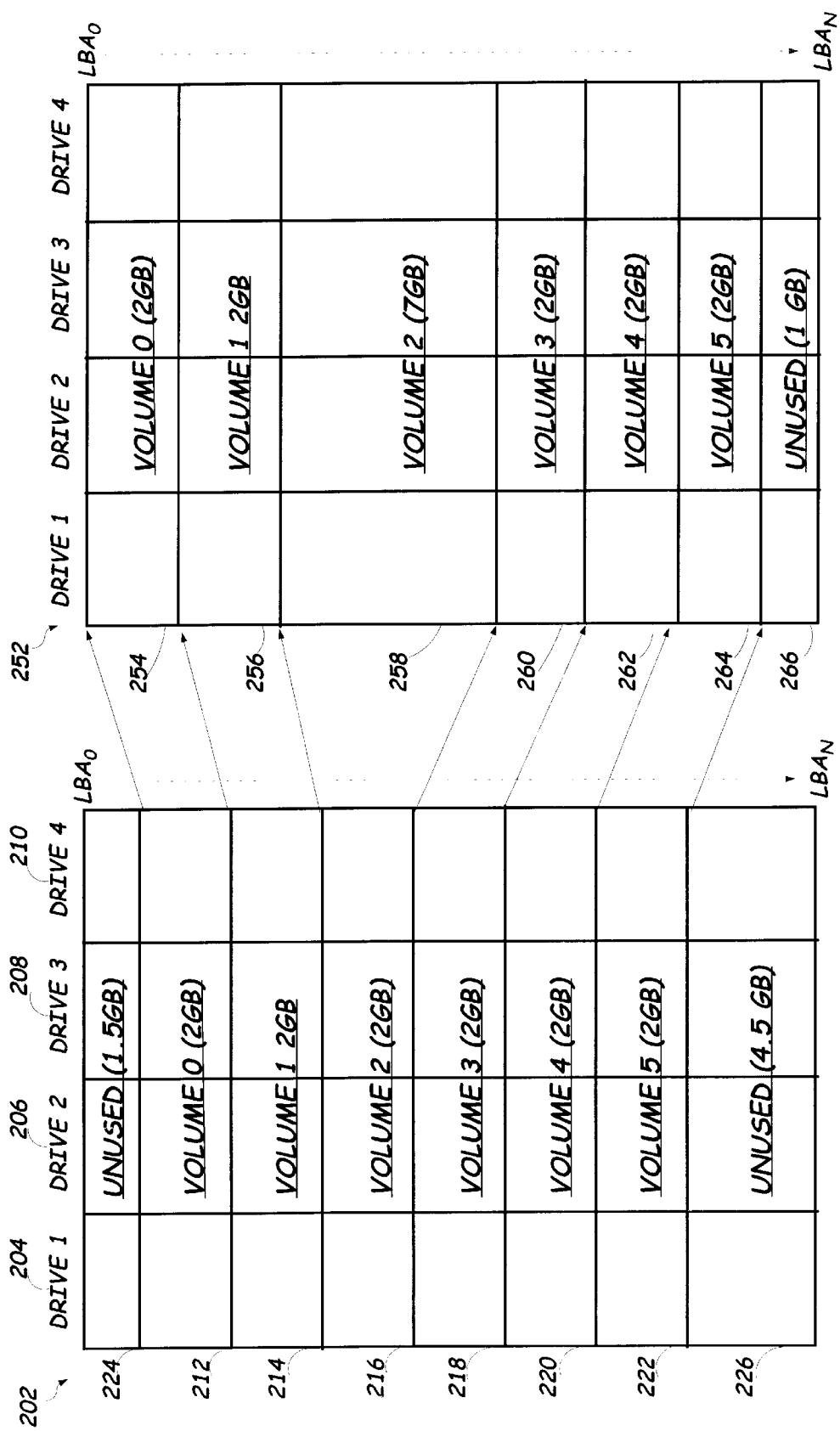
FIG. 2 is an illustration of an exemplary embodiment of the present invention wherein a volume included across a plurality of devices is expanded utilizing the present invention.

Referring now to FIG. 2, an exemplary embodiment 200 of the present invention is shown wherein a volume included across a plurality of devices is expanded utilizing the present invention. Volumes may exist along an array 202 of drives. In this example, four drives 204, 206, 208 and 210, arranged in an array 202, include Volume Zero 212, Volume One 214, Volume Two 216, Volume Three 218, Volume Four 220 and Volume Five 222, each of which is two gigabytes in size. However, it may be desirable to expand the capacity of Volume Two 216 by five gigabytes, from the two original gigabytes, to total of seven total gigabytes. Therefore, a DVE command is initiated to expand Volume Two 216. Data segments in a first hierarchy to the DVE target volume are queried first, in this instance Volume Three 218 and then Volume One 214.

Since there is no available capacity, a second hierarchy is queried for additional capacity, in this instance Volume Four 220 and Volume Zero 212. During a query for a third hierarchy, 1.5 gigabytes of unused capacity 224 are located "above" Volume Zero 212. However, this additional capacity does not provide sufficient capacity for expanding Volume Two 216 by the requested amount. Therefore, the query continues progressing among successive hierarchies until unused capacity 226 is located "below" Volume Five 222, where 4.5 gigabytes of capacity are found. After a sufficient amount of capacity has been located, the capacity needs to be positioned with the target DVE volume, in this instance Volume Two 216. This may be accomplished by moving the offsets of the corresponding volumes.

For example, Volume Zero 212 may be moved "outward" to incorporate the Unused Capacity 224. Offsets corresponding to successive volumes are also moved outward, such as Volume One 214 and Volume Two 216. Therefore, once moved, Volume Zero 254 in the reconfigured disk array 252 may be positioned at the start of the disk array 252, with Volume One 256 and Volume Two 258 positioned directly thereafter. In this way, the ordering of the volumes is maintained with minimized movement of data to provide additional capacity to Volume Two 258 by moving volumes and adding capacity.

Likewise, Volume Three 218, Volume Four 220 and Volume Five 222 may be moved outward, i.e. to a logic block address (LBA) further away from the target DVE Volume Two 216, to position unused capacity with the target DVE volume. Therefore, once moved, Volume Three 260, Volume Four 262 and Volume Five 264 would be positioned so as to enable the unused capacity 224 to be positioned with Volume Two 258. Additional unused capacity 266 after movement may still be positioned at the end of the volumes. It should be noted, that utilization of the unused capacity may be altered depending on the desires of the user. For example, in the previous example the hierarchies were searched by volume and the entirety of the unused capacity 224 positioned at the end of the drive array 202, the unused capacity may also be positioned elsewhere without departing from the spirit and scope of the present invention.

Figure 3:
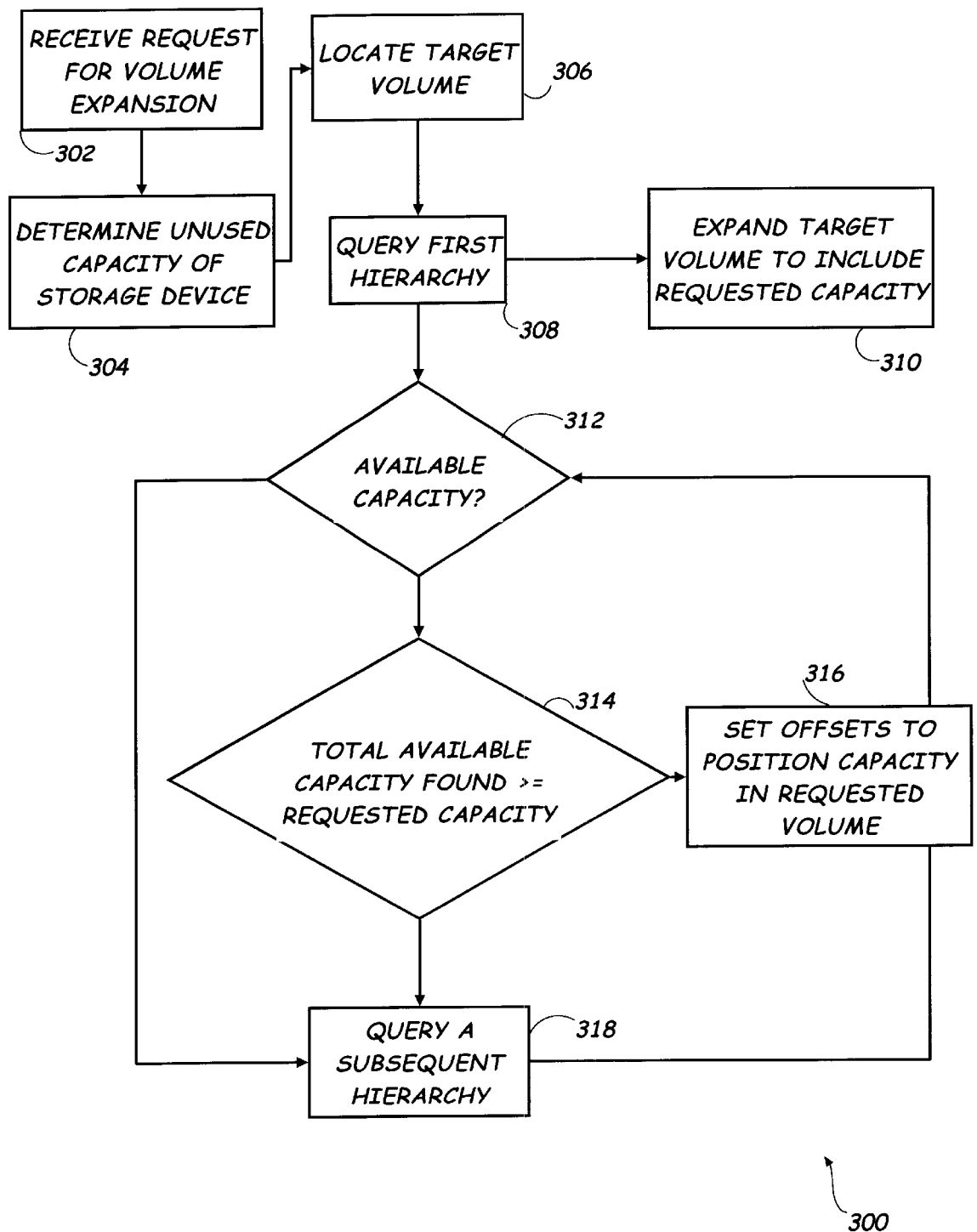
FIG. 3 is a flow chart illustrating an exemplary method of the present invention wherein volumes are queried in hierarchies to limit volume movement.
Figure 4:
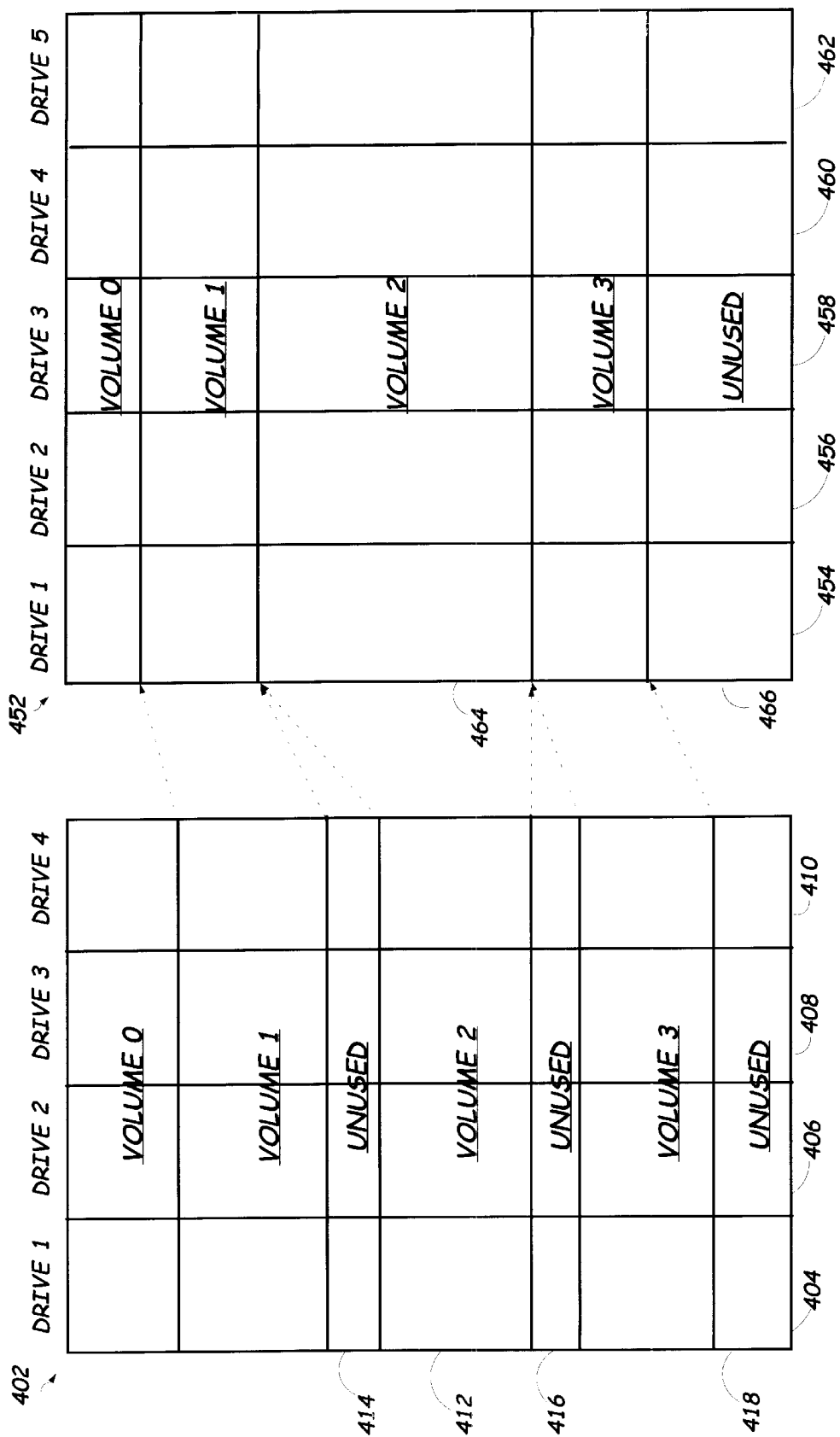
FIG. 4 is an illustration of an exemplary embodiment of the present invention wherein a combination dynamic capacity expansion and dynamic volume expansion may be utilized to expand a target volume.

Referring now to FIG. 3, an exemplary embodiment of the present invention is shown wherein volumes are queried in hierarchies to limit volume movement. A request for a volume expansion is received 302. Such a volume may exist on a storage device including a single storage device, multiple storage devices, such as a drive array, and the like without departing from the spirit and scope of the present invention. The unused capacity of the storage device is determined 304 and "holes" or portions of unused capacity are located. Locating volume offsets and the lengths of the volume following that offset may be utilized to accomplish this determination. For example, if there is a hole between the end of the length of a previous volume, which may be indicated by an offset, and a subsequent volume, a hole of unused capacity is available to be used for expansion. Thus, to find a hole, a system looks at volumes, adds offset and length to obtain the end of the volume, finds beginning of next volume, gets offset, and if there is a difference between the end of the volume and offset of next volume, then there is a hole, and the size of the hole is also known.

The target volume for expansion is then located 306, and starting from that volume outward, available capacity is located. Thus hierarchies of volumes may be queried, with a first hierarchy located at a LBA closer to the target volume than a second hierarchy. Preferably, the space following the target volume is queried first to determine if a hole exists directly under the target volume 308. If there is a hole, and sufficient capacity exists in the hole to expand the target volume, the capacity is added to the target volume 310, and no volumes need to be moved.

However, if the hole is not directly under the target volume, a second hierarchy is queried to look for additional capacity 312. If sufficient capacity is located to expand the target volume 314, then the volumes may be moved to position the addition capacity at the end of the target volume 316. If there is not sufficient capacity, successive hierarchies may be queried 318, as shown in FIGS. 1, 2 & 3, until sufficient capacity is located, and then the volume moved to position that capacity with the target volume. In this way, if volume movement is necessary, it is accomplished with the least amount of volume movement and preserves the ordering of the volumes on the storage device.

If a user requests a DVE, but does not have enough unused capacity available, one or more additional storage devices may be added at the same time that the volumes are rearranged. For example, as shown in the embodiment 400 illustrated in FIG. 4, adding a storage device may be utilized to expand a target volume. In this example, a storage device 402 includes an array of disk drives 404, 406, 408, and 410. A request to expand Volume Two 412 by a requested amount is received. However, even though unused capacity 414, 416 and 418 exists on the storage device 402, the available capacity is less than the requested amount for expansion. Therefore, an additional drive may be added to increase the capacity of the drive array.

For instance, an expanded drive array 452 may be configured to include Drive One 454, Drive Two 456, Drive Three 458, and Drive Four 460, as well as an additional Drive Five 462, which is added to increase the total storage capacity of the drive array 452. As the new offset and piece lengths are being determined, the requested amount of additional capacity will be left at the end of the targeted volume, in this instance Volume Two 464. Preferably, a defragmenting function is also performed to position the unused capacity 466 in a unified segment.

It is believed that the method and system for expanding volume capacity of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of expanding volume capacity on a storage device, comprising:

receiving a request to expand capacity of a target volume by a requested amount;

querying a first hierarchy for unused capacity, wherein if unused capacity is at least one of greater than or equal to the requested amount, the unused capacity is positioned to be included with the target volume and if unused capacity is less than the requested amount, at least one successive hierarchy is queried to locate unused capacity which is at least one of greater than or equal to the requested amount, the successive hierarchy located at a logic block address farther from a target volume logic block address than a first hierarchy logic block address, the unused capacity used to expand the target volume being located to provide minimal volume movement; and positioning the unused capacity to be included with the target volume, wherein the target volume is defined as an equal number of blocks distributed across multiple disk drives, the storage device including the multiple disk drives, the target volume expanding to include a greater size in each of the multiple disk drives.

2. The method of claim 1, wherein, after the method is implemented and then terminated, any unused capacity is contiguously located only by the highest logical block addresses.

3. The method of claim 1, wherein the volumes are in contiguous blocks of storage to enable a mathematical calculation to be performed to determine where a specific block of memory is to reside.

4. The method of claim 1, wherein the target volume expands so as to start at a lower logical block address.

5. The method of claim 1, wherein the target volume expands so as to end at a higher logical block address.

6. The method of claim 1, wherein the multiple disk drives do not increase in number.

7. The method of claim 1, wherein the multiple disk drives increase in number.

8. A method of expanding volume capacity on a storage device, comprising:

receiving a request to expand capacity of a target volume having an initial capacity by a requested amount;

determining unused capacity of the storage device;

locating the target volume;

querying successive hierarchies for unused capacity, wherein a first hierarchy is queried before a second hierarchy, the first hierarchy located at a logic block address closer to the target volume than the second hierarchy;

locating unused capacity at least one of greater than and equal to the requested amount; and positioning the unused capacity to be included with the target volume, the unused capacity used to expand the target volume being located to provide minimal volume movement, wherein a volume, including the target volume, is defined as an equal number of blocks distributed consistently across multiple disk drives, the storage device including the multiple disk drives, the target volume expanding to include a greater size in each of the multiple disk drives.

9. The method as described in claim 8, wherein determining the unused capacity of the storage device includes locating holes.

10. The method as described in claim 9, wherein determining the unused capacity includes querying for volume offsets and lengths of volumes following the offset so that, to find a hole, an offset and length of a first volume are determined and a beginning of a second volume is found by locating a second volume offset, and if there is a space between the first volume and the second volume, that space is a hole.

11. The method as described in claim 10, wherein size of the hole is determined from an end of the first volume and a beginning of the second volume.

12. The method as described in claim 8, wherein unused capacity is positioned by at least one of positioning an offset of at least one volume surrounding the target volume.

13. The method as described in claim 8, wherein unused capacity includes a plurality of unused capacity segments.

14. The method of claim 8, wherein the volumes are in contiguous blocks of storage to enable a mathematical calculation to be performed to determine where a specific block of memory is to reside.

15. The method of claim 8, wherein the target volume expands so as to start at a lower logical block address.

16. The method of claim 8, wherein the target volume expands so as to end at a higher logical block address.

17. The method of claim 8, wherein the multiple disk drives do not increase in number.

18. The method of claim 8, wherein the multiple disk drives increase in number.

19. A method of expanding volume capacity on a storage device, comprising:

receiving a request to expand capacity of a target volume having an initial capacity by a requested amount;

determining unused capacity of the storage device;

querying successive hierarchies surrounding the target volume for unused capacity, wherein a first hierarchy is queried before a second hierarchy, the first hierarchy located at a logic block address closer to the target volume than the second hierarchy, until unused capacity at least one of greater than and equal to the requested amount is located; and positioning the unused capacity with the target volume, the unused capacity used to expand the target volume being located to provide minimal volume movement, wherein all volumes, including the target volume, are distributed across multiple disk drives, the storage device including the multiple disk drives, the target volume expanding to include a greater size in each of the multiple disk drives.

20. The method as described in claim 19, wherein determining the unused capacity of the storage device includes locating holes.

21. The method as described in claim 20, wherein determining the unused capacity includes querying for volume offsets and lengths of volumes following the offset so that, to find a hole, an offset and length of a first volume are determined and a beginning of a second volume is found by locating a second volume offset, and if there is a space between the first volume and the second volume, that space is a hole.

22. The method as described in claim 21, wherein size of the hole is determined from an end of the first volume and a beginning of the second volume.

23. The method as described in claim 19, wherein unused capacity is positioned by positioning an offset of at least one volume surrounding the target volume.

24. The method as described in claim 19, further comprising locating unused capacity.

25. The method as described in claim 19, wherein unused capacity includes a plurality of unused capacity segments.

26. The method of claim 19, wherein the volumes are in contiguous blocks of storage to enable a mathematical calculation to be performed to determine where a specific block of memory is to reside.

27. The method of claim 19, wherein the target volume expands so as to start at a lower logical block address.

28. The method of claim 19, wherein the target volume expands so as to end at a higher logical block address.

29. The method of claim 19, wherein the multiple disk drives do not increase in number.

30. The method of claim 19, wherein the multiple disk drives increase in number.

31. A method of expanding volume capacity on a storage device, comprising:

receiving a request to expand capacity of a target volume having an initial capacity by a requested amount, the target volume being one of a plurality of volumes included in the storage device, the plurality of volumes arranged in a specific order;

querying successive hierarchies surrounding the target volume for unused capacity, wherein a first hierarchy is queried before a second hierarchy, the first hierarchy being located at a logic block address closer to the target volume than the second hierarchy, until unused capacity at least one of greater than and equal to the requested amount is located; and positioning the unused capacity with the target volume so that the plurality of volumes remain arranged in the specific order, the unused capacity used to expand the target volume being located to provide minimal volume movement, wherein each of the plurality of volumes is defined as an equal number of blocks distributed across multiple disk drives, the storage device including the multiple disk drives, the target volume expanding to include a greater size in each of the multiple disk drives.

32. The method of claim 31, wherein the volumes are arranged in a specific order to maintain a volume performance characteristic within a disk drive.

33. The method of claim 31, wherein the step of querying continues until sufficient capacity is located.

34. The method of claim 31, wherein an additional storage device is may be added during the positioning step.

35. The method of claim 31, the positioning step further comprising a defragmenting step.

36. The method of claim 31, wherein the request is made by a user.

37. The method of claim 31, wherein the volumes are in contiguous blocks of storage to enable a mathematical calculation to be performed to determine where a specific block of memory is to reside.

38. The method of claim 31, wherein the target volume expands so as to start at a lower logical block address.

39. The method of claim 31, wherein the target volume expands so as to end at a higher logical block address.

40. The method of claim 31, wherein the multiple disk drives do not increase in number.

41. The method of claim 31, wherein the multiple disk drives increase in number.

* * * * *